United States Patent [19]
Busch

[11] Patent Number: 5,502,376
[45] Date of Patent: Mar. 26, 1996

[54] APPARATUS FOR CONTROLLING THE DUTY CYCLE OF A PULSE GENERATOR

[75] Inventor: Frederick J. Busch, Cleveland Heights, Ohio

[73] Assignee: Avtron Manufacturing, Inc., Independence, Ohio

[21] Appl. No.: 248,302

[22] Filed: May 24, 1994

[51] Int. Cl.⁶ .................... G01P 3/48; G01P 3; G01P 54
[52] U.S. Cl. .................... 324/166; 324/173; 324/207.25; 327/175
[58] Field of Search ...................................... 324/166, 173, 324/174, 207.25, 202; 341/155, 164, 162; 332/109; 327/100, 172, 175, 176, 178, 184, 147, 151, 156; 364/565, 569; 375/317, 238, 309; 340/825.63, 825.65

[56] References Cited

U.S. PATENT DOCUMENTS

| | | | |
|---|---|---|---|
| 4,257,005 | 3/1981 | Hall | 324/166 |
| 4,434,470 | 2/1984 | Thomas et al. | 324/166 |
| 4,485,452 | 11/1984 | Cording et al. | 324/166 |
| 4,884,227 | 11/1989 | Watanabe | 324/166 |
| 4,902,970 | 2/1990 | Suquet | 324/173 |

FOREIGN PATENT DOCUMENTS 2228985 of 1972 Germany ........................ 324/166

Primary Examiner—Sandra L. O'Shea
Assistant Examiner—Jay M. Patidar
Attorney, Agent, or Firm—Tarolli, Sundheim & Covell

[57] ABSTRACT

Apparatus is presented for controlling the duty cycle of a pulse generator which provides a periodic input signal having a frequency proportional to the rate of movement of an input member. The input signal is compared with a threshold signal and, for each cycle of the periodic signal, an ON signal is provided so long as the magnitude of the input signal exceeds that of the threshold signal. The apparatus for controlling the duty cycle includes a clock source for providing clock pulses having a fixed frequency rate. A first counter counts the total number of clock pulses occurring during an interval corresponding with N of the ON pulses to provide a total count of B. A second counter counts the total number of clock pulses occurring during each of the N ON pulses and provide a total count of A. The ratio of A to B is calculated to provide a ratio R. A new value is calculated for the threshold signal for replacing the previous value of the threshold signal wherein the new value varies as a function of the value of the ratio R.

19 Claims, 3 Drawing Sheets

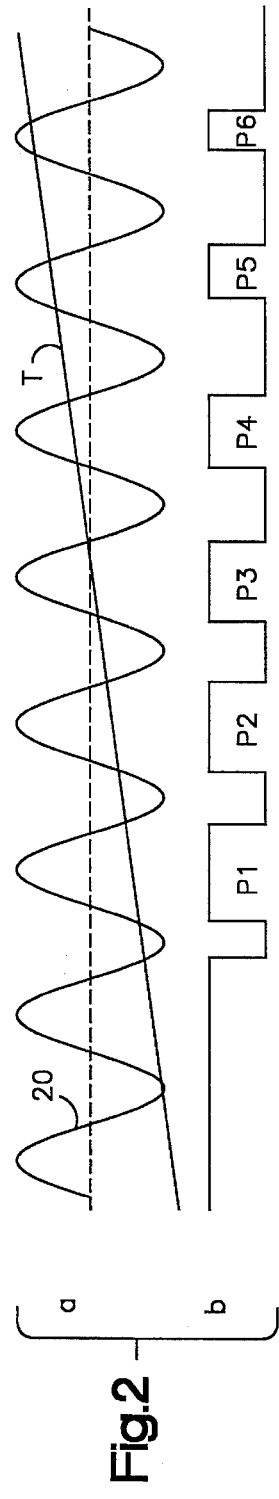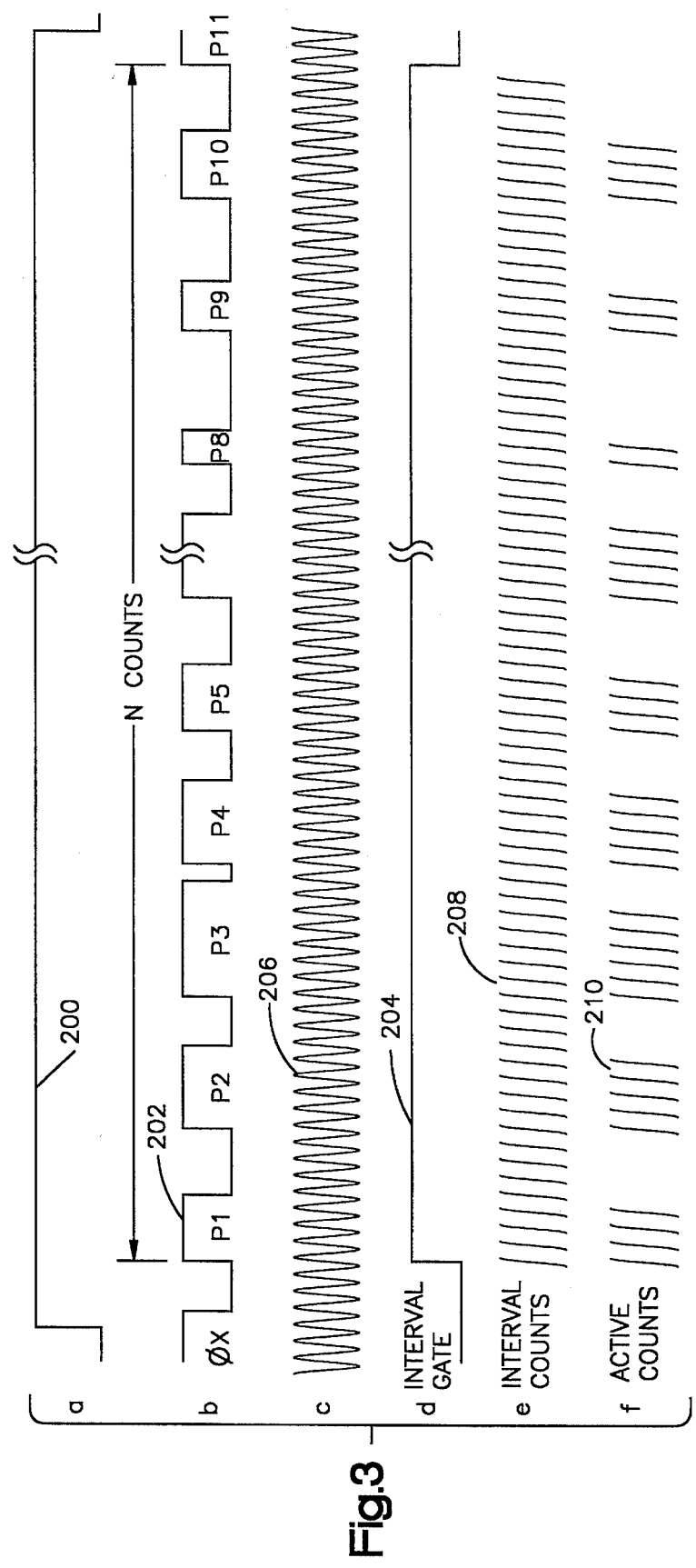

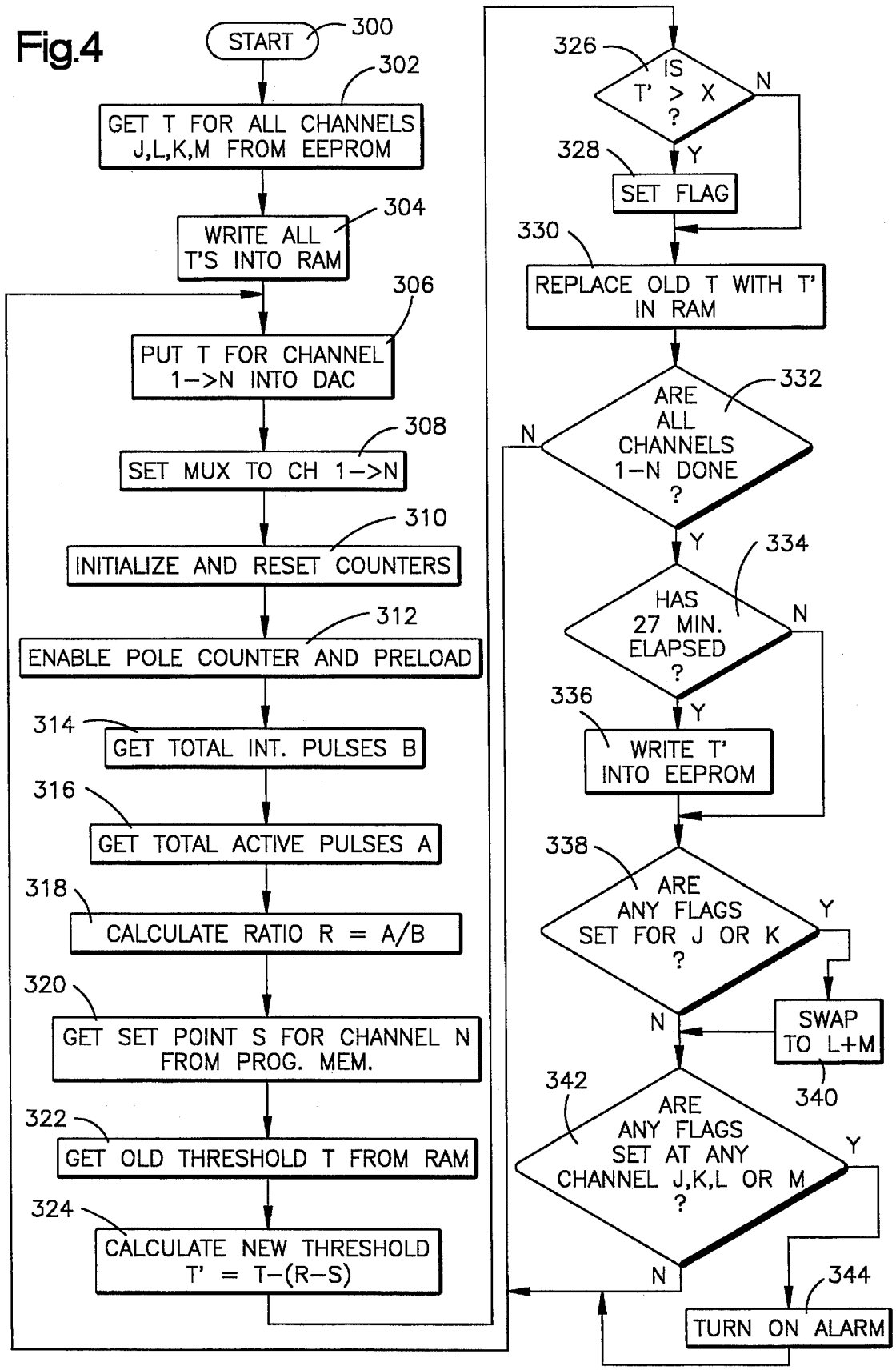

5,502,376

APPARATUS FOR CONTROLLING THE DUTY CYCLE OF A PULSE GENERATOR

TECHNICAL FIELD

This invention relates to the art of pulse generators and, more particularly, to improvements for controlling the duty cycle thereof.

BACKGROUND OF THE INVENTION

Pulse generators are known in the art and frequently output squarewave signals with a frequency proportional to the rate of rotation of an input shaft. Such pulse generators typically incorporate a sensor which produces a sinusoidal signal with a frequency proportional to the rate of the input shaft. The sinusoidal signal is conditioned and converted to a train of output squarewave signals for transmission to counters and controllers and the like. An ideal squarewave may, for example, have a 50% duty cycle. The duty cycle is typically defined as the percentage of time the output signal is high or ON relative to the time for one complete cycle of the sinusoidal signal. The circuitry employed frequently superimposes the sine wave on a DC offset. The signal conditioning circuitry that converts the sensor sine wave to a squarewave signal must be adjusted to compensate for this offset. This can be accomplished with selected resistors or potentiometers. Once adjusted, however, if the sensor DC offset changes from aging, temperature or any other environmental factors, there is a detrimental impact on the output squarewave duty cycle. The deterioration of the output duty cycle will continue until it reaches a failure condition for a particular application and the rotary pulse generator would need to be replaced.

One method known in the prior art for compensating for sensor DC offset changes is to provide temperature compensation. This requires that parts with opposing temperature coefficients be matched together for compensation. This technique has limitations in that the matches are never perfect. The control in this technique is open loop and the duty cycle is only indirectly corrected for as it does not take into account aging and other environmental factors.

Another method of compensation known in the art may be referred to as capacitor coupling. In this technique, the sinusoidal output of the pulse generator sensor is passed through a series capacitor that blocks the DC portion of the signal. The limitation of this technique is that on start up the capacitor must be charged and several cycles must pass before an output signal is generated.

It has been known in the prior art to try to adjust the duty cycle of the pulse generator based on looking at the input conditions only. It is believed that no attempts have been made in the prior art to try to adjust the duty cycle based on looking at the output conditions of a comparator to adjust the threshold thereof.

The M. Suquet U.S. Pat. No. 4,902,970 discloses a rotary pulse generator which provides a quasi-sinusoidal signal with the frequency being related to the speed of shaft rotation. The sinusoidal signal is supplied to a comparator which is employed for purposes of providing a train of squarewave pulses. This patent does not appear to recognize the need to control the duty cycle of the squarewave signal because of variations in the DC offset with time and temperature as recognized by the invention herein. Moreover, there is no suggestion in this patent that the duty cycle be controlled by varying the threshold signal.

SUMMARY OF THE INVENTION

The present invention contemplates the provision of a pulse generator which provides a cyclical periodic input signal, such as a sinusoidal signal, having a frequency proportional to the rate of movement of an input member, such as a rotary shaft. A comparator compares the input signal with a threshold signal and provides, for each cycle of the input signal, an ON signal so long as the input signal exceeds the threshold signal. The duty cycle corresponds with the ratio of the time duration of each ON signal to the duration of each cycle.

In accordance with the present invention, apparatus is provided for controlling the duty cycle. This apparatus includes a clock source for providing clock pulses having a fixed frequency rate. A first counter is provided for counting the total number of clock pulses that occur during an interval corresponding with a selected number N of the ON pulses to thereby provide a total count of B. A second counter is provided for counting the total number of the clock pulses that occur during each of the N ON pulses to provide a count of A. The ratio of A to B is then calculated to provide a ratio R. A new threshold is calculated to replace the old threshold with the new threshold having a value that varies as a function of the value of ratio R.

BRIEF DESCRIPTION OF THE DRAWINGS

The foregoing and other objects and advantages of the present invention will become more readily apparent from the following description as taken in conjunction with the accompanying drawings, wherein:

FIG. 2 includes graphical illustrations (a,b) of amplitude with respect to time useful in describing the invention herein;

FIG. 3 includes graphical illustrations (c,f) of amplitude with respect to time useful in describing the invention herein; and FIG. 4 is a flow diagram illustrating the manner in which the computer employed in FIG. 1 is programmed in accordance with the present invention.

DESCRIPTION OF PREFERRED EMBODIMENT

Figure 1:
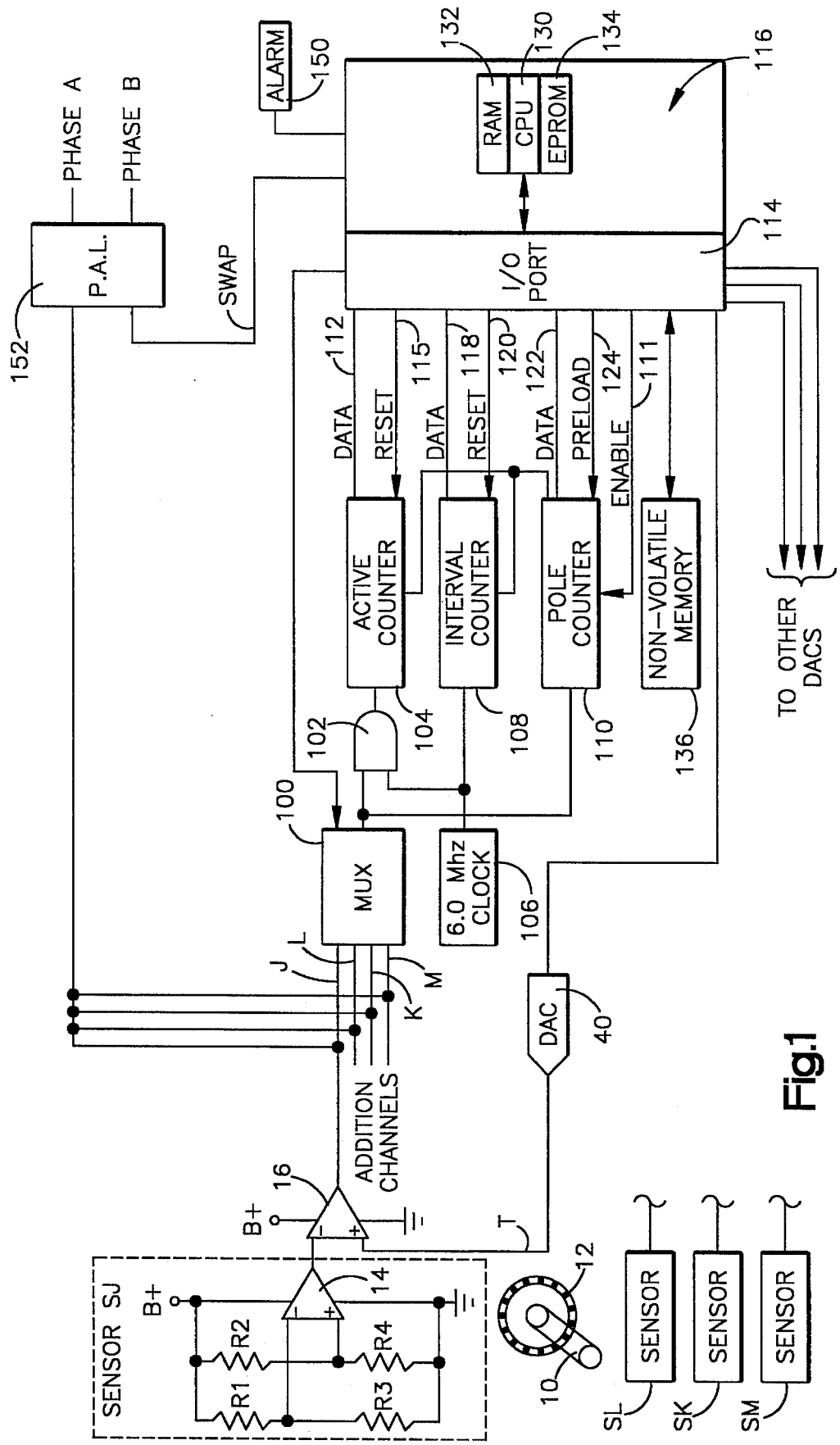
FIG. 1 is a schematic-block diagram illustration of one embodiment of the invention.

Reference is now made to the drawings wherein the showings are for purposes of illustrating a preferred embodiment of the invention only and not for purposes of limiting same. Reference is made to FIG. 1 which illustrates a shaft 10 having a rotor 12 mounted thereon for rotation with the shaft. The rotor is provided with a periodic structure which may include magnetization or an optical pattern for use in measuring the speed of rotation of the shaft 10. In the embodiment illustrated, the rotor is illustrated as having an annular array of north and south poles made up of an array of patches which are alternately magnetized or polarized in opposing directions to provide an array of alternately north and south poles. These magnetic poles or patches are shown as being applied to a side surface near the periphery of the rotor 12, it being understood that the patches in practice may be mounted on the peripheral or circumferential edge, as desired.

As is conventional, a sensor is positioned proximate to the rotor 12 for purposes of developing a sinusoidal signal having a frequency proportional to the rate of rotation of the input shaft 10. It is contemplated that a sensor is provided for each of four channels J, K, L and M. Each of the sensors SJ, SK, SL AND SM is constructed as shown in detail in FIG. 1 with reference to sensor SJ. This sensor includes a bridge circuit including resistive sensing elements R1, R2, R3 and R4 mounted in a bridge arrangement, as shown, and connected to an operational amplifier 14. The output is a sinusoidal signal which is offset from ground in a positive direction because of a DC offset bias provided by a B+ voltage supply source. The output of sensor SJ is supplied to a comparator 16 which provides a train of squarewave pulses for transmission to counters and controllers and the like.

Reference is now made to FIG. 2 which illustrates a sinusoidal wave 20 which represents the output sinusoidal signal obtained from the sensor SJ. This sinusoidal signal is associated with a threshold signal T. The sinusoidal signal 20 and the threshold T are supplied to the comparator 16. The threshold T is shown in the waveforms of FIG. 2 as varying in magnitude with respect to time resulting in output pulses P1, P2, P3, etc. obtained from comparator 16 with these pulses having a varying width or ON time during each cycle. Pulse P3 is shown as being representative of approximately a 50% duty cycle (the percentage of time that the output pulse P3 is high relative to the time for one complete cycle). In this same example, pulse P1 represents a duty cycle which is approaching 100% whereas pulse P6 represents a duty cycle which is approaching zero. Consequently, it is seen that the duty cycle can be changed by changing the magnitude of the threshold. If the duty cycle deteriorates because of changes in the DC offset, this may result in a failure condition for a particular application, such as loss of pulses, and the pulse generator may need to be replaced. In accordance with the present invention, circuitry is provided for monitoring the duty cycle and continuously changing or adjusting the magnitude of the threshold T in order to obtain a desired level of duty cycle such as 0.50 or 0.37 or 0.60 or whatever duty cycle is desired for the application involved. This is achieved with the circuitry to be described in greater detail below.

Each of the sensors SJ, SK, SL, SM is connected to its own comparator 16. The output of the comparator 16 represents the output from a particular channel of a group, such as channels J, K, L and M. The output of comparator 16 associated with sensor SJ is supplied along with the outputs from the additional channels L, K and M to a multiplexer 100 and, thence, through an AND gate 102 to an active pulse counter 104. A second input to the AND gate 102 is obtained from a clock source 106 which serves as a fast clock providing a pulse train having a frequency on the order of 6.0 MHz. The clock frequency is on the order of 100 times the maximum anticipated frequency of the pulse generator. These clock pulses are supplied to an interval counter 108. The output of the multiplexer 100 is also supplied to a pole counter 110 having an output supplied to each of the counters 104 and 108, as will be described hereinafter. A data bus 112 connects counter 104 to the input/output port 114 of a microcontroller 116. A reset control line 115 extends from the microcontroller to the counter 104 for resetting the counter, as will be described in detail hereinafter. In a similar manner, the counter 108 has a data bus 118 connected to the microcontroller 114 and a reset control line 120 is connected from the controller 114 to the counter 108. Also, a data bus 122 connects the pole counter 110 with the microcontroller 114 and a preload line 124 interconnects the input/output port with the counter 110.

The microcontroller 116 may be conventional in the art and, for example, may include a structure including an input/output port 114, a central processing unit (CPU) 130, a random access memory (RAM) 132 and a program memory in the form of a EPROM 134. Additional memory is provided by an EEPROM 136 which is a non-volatile memory and which serves to store values of a threshold, to be discussed hereinafter.

The microcontroller, as will be described in greater detail hereinafter, monitors the duty cycle of each channel and, if needed, adjusts the threshold to that channel's comparator 16 by providing a suitable digital output which is converted by a digital-to-analog converter 40 associated with that channel. Additionally, the microprocessor determines for each channel whether the duty cycle has been changed to the extent that a major change is required to value of the threshold and an alarm 150 is energized. This may be a visual or audible alarm. Also, the output squarewave from the comparator 16 for each of the channels is supplied to a programmable array logic (P.A.L.) circuit 152 which uses two of the channels, in a known manner, for providing output signals known as phase A and phase B signals. Normally, the P.A.L. 152 uses channels J and K for this purpose and will use channels L and M if it receives a swap input signal. Such a swap input signal is supplied to the program array logic in accordance with the present invention by the microcontroller 114 when the microcontroller determines that the conditions warrant it. This will be described in greater detail hereinafter.

In operation, the microcontroller, under program control, will enable the pole counter 110 with an enable signal 200, see FIG. 3, by way of an enable line 111. Additionally, the computer will preload a pole count into the pole counter by way of a preload control line 124 and a data line 122. This preloads the counter with a fixed number N representing a pole count of N. Each pole can also be considered as an ON pulse, such as pulses P1, P2, P3, etc. in FIG. 2 discussed previously. In the example given in FIG. 3, N may equal a count of ten. Waveform 202 includes a pulse train showing pulses P1 through P11. During the period from the leading edge of pulse P1 to the leading edge of pulse P11, an enable interval gate signal 204 is provided which resets and enables the interval counter 108 so that it will count all of the clock pulses 206 obtained from the clock 102 that occur during the time interval represented by the signal 204. The clock pulses 206 that are counted during the time interval 204 are indicated by interval count waveform 208 in FIG. 3. These clock pulses are supplied to the counter 108 to obtain a total count of B pulses where B is a whole number. In the example being given, the total count may be on the order of 100 pulses. In addition to this interval count, another counter 104 counts the total number of clock pulses that occur during each of the ON pulses P1 through P10. This is shown by the waveform 210 wherein a different number of active counts is counted for each of the various pulses P1, P2, etc. The average number of clock pulses during each of the ON pulses P1, P2 may be on the order of five counts for a total count of 50 for a 50% duty cycle. The total count for each pulse may differ from five, such as the total clock pulses corresponding to ON pulse P1 may be four, whereas the total clock pulses counted for the ON pulse P2 may be five and the total pulse count corresponding to ON pulse P3 may be six, etc. The average number of clock pulses for each ON pulse is five for the total count of 50 active pulses over an interval count of 100 for a duty cycle of 0.50. This represents the ratio R of the number of active pulses 50 to the total number of interval pulses 100. If the desired duty cycle is 0.50, then a set point S is at 0.50. As described later herein, the set point is obtained from a programmed memory in the microcontroller. The set point represents the desired duty cycle. The difference between the actual duty cycle R and the set point S is zero and there is no need to change the magnitude of the threshold supplied to the comparator 16. However, if the actual duty cycle R differs from the set point S, then a change in the value of the threshold will be calculated by the computer, as will be described in greater detail hereinafter.

Reference is now made to FIG. 4 which shows the manner in which the microcontroller 114 is programmed in accordance with the present invention to accomplish the functions described herein. The start of the procedure commences at step 300 and then proceeds to step 302 at which the values for the threshold T to apply to the comparators 16 for all of the channels J, K, L and M, are obtained from the EEPROM 136. The values of these thresholds are then written into the RAM 132 at step 304 in the microcontroller 116.

At this point, the threshold for the first channel to be monitored is supplied to the digital-to-analog converter associated with that channel. The sequence may be in the order of channels J, L, K and M and repeat. Consequently, the operation may commence with supplying the threshold T for channel J to the digital-to-analog converter DAC 40. This threshold may, for example, be the appropriate value to obtain a duty cycle of 50% or some other selected duty cycle, such as 40% (0.40). This is accomplished in step 306.

In step 308, the multiplexer 100 is set so that it will pass the pulses obtained from the comparator associated with the selected channel. In the example being given, the first selected channel is channel J. Consequently, the multiplexer 100 will pass the pulses obtained from comparator 16 associated with this channel.

In step 310 the microcontroller resets the active counter 104 by way of reset line 115 to a count of zero and resets the interval counter 108 by way of reset line 120 to a count of zero. These counters are now conditioned to commence the counting functions to be described below.

In step 312, the microcontroller 114 enables the pole counter 110 by way of enable line 111 with an enabling signal 200 (see FIG. 3) which will enable the pole counter for a period sufficient to exceed N pole counts. N in the example being given is ten. Thus, the leading edges of pulses P1 through P11 (see waveform 202 in FIG. 3) are counted so that a total of ten pulses or ten ON times are counted by the pole counter 110. During the interval of these pole counts, the pole counter 110 provides an enabling signal 204 (see FIG. 3) to enable the active counter 104 and the interval counter 108. During this interval, the interval counter 108 counts clock pulses obtained from the clock 106 and at the end of the interval there will be, in the example being presented, a total count on the order of 100 pulses. During this same interval, the active counter 104 will count clock pulses passed by the enabled AND gate 102 which is enabled during the time duration of each of the pulses P1 through P10. As shown by the waveform 210 in FIG. 3, some of these pole ON times will provide five active counts, or six active counts, etc. with the average being on the order of five counts. For a 50% duty cycle, the total at the end of the interval represented by signal 204 will be on the order of 50 pulses.

At the end of the interval, the microcontroller will, in step 314, get the total number of interval pulses B and this will be on the order of 100 pulses in the example being presented. In accordance with step 316, the microcontroller will get the total number of active pulses A, as represented by the waveform 210, and this should be on the order of approximately 50 pulses for a 50% duty cycle.

In accordance with step 318, the ratio R of the total number of active pulses A to the total number of interval pulses B is calculated. If the total number of active pulses is 50 and the total number of interval pulses is 100, then the ratio R is 0.50 which is representative of a 50% duty cycle.

In accordance with step 320, the set point S for the channel under consideration (channel J) is obtained from the program memory 134. The set point represents the desired duty cycle. If the desired duty cycle is 50% (0.50) then this would be the value of S obtained from the program memory.

In accordance with step 322, the microcontroller obtains the old value of the threshold T from the random access memory (RAM) 132. This is the voltage level that is supplied by the DAC 40 to the comparator 16.

In accordance with step 324, the microcontroller calculates the new threshold T'

$$T'=T-(R-S)C \tag{1}$$

where C is a coefficient for converting the value of R-S from a percentage to a voltage level for correcting the value of the old threshold T to obtain the new threshold T'. In the example being given, if the set point S is 0.50 and the ratio R is calculated to be 0.50, then no correction is required and solving equation (1) results in the new threshold T' being equal to the old threshold T. However, to the extent that the ratio R differs from the set point S, there will be a change in the value of the threshold.

In step 326, the new threshold T' is compared with a value X. The value X represents a level indicative of a potential failure situation. This is done to determine if the value of the new threshold T' is now greater than the value X. If so, then this indicates that the correction for the new threshold exceeds a level indicative of a potential failure situation suggesting that the rotary pulse generator should be replaced. If this level is exceed, then, at step 328 a flag is set and this will result in actuation of an alarm after all of the channels have been reviewed, as will be discussed in greater detail hereinafter.

In step 330 the old threshold T is replaced with the new threshold T' in the RAM 132 for the channel that has just been reviewed. In the example being given, this was channel J.

At step 332 a determination is made as to whether all channels 1 through N where N is a whole number, have been reviewed. In the example being given, each of the four channels J, K, L and M are reviewed in sequence. If all of the channels have not been reviewed, then the loop is repeated for the next channel. If all of the channels have been reviewed, then the procedure advances to step 334.

In this step, a predetermined period of time is measured before writing the new threshold T' into the EEPROM 136. This predetermined period of time is required since the EEPROM's available at this time exhibit characteristics that require that they not be rewritten too many times. It has been determined that a time lapse on the order of 27 minutes is sufficient for this purpose. Consequently, in step 334 a time limit on the order of 27 minutes is timed out since the memory was last rewritten before the new threshold T' is written into the EEPROM 136 in step 336. By storing the new threshold T' in memory 336, a threshold value is provided so that after the pulse generator has stopped and is then started up, there is an immediate threshold value that may be employed for setting the threshold of the DAC 40 for the next channel to be reviewed as opposed to running several cycles before a proper threshold has been provided.

In step 338, a determination is made as to whether any flags have been set for channel J or channel K. This deals with a channel swap feature of the present invention. Thus, it is contemplated that four channels J, K, L and M are provided each having its own sensor SJ, SK, SL and SM. These channels provide squarewave pulse trains to the counting circuitry that has been described thus far. The squarewave pulse trains are also supplied to a programmable array logic circuit 152. This circuit utilizes a first pair of channels J and K or a second pair of channels L and M to provide a divide by two function or a times one function or it uses all four to provide a times two function (for which there is no swap). In the first two applications (divide by two or times one), the circuit normally uses the J and K channels to provide the intended function. However, if either channel J or channel K is not operating properly because a flag had been set (at step 328), then a swap signal is supplied by the microcontroller to the PAL 152 circuit. If any flags have been set in either channel J or K, then in accordance with step 340, a swap signal is supplied to the PAL 152 circuit.

In step 342, a determination is made as to whether any flags have been set for any of the channels J, K, L or M. If so, then in accordance with step 344, an alarm 50 is activated to alert an operator that a flag has been set which is indicative that the pulse generator may need to be replaced.

Although the invention has been described in conjunction with a preferred embodiment, it is to be appreciated that various modifications may be made without departing from the spirit and scope of the invention as defined by the appended claims.

Having described the invention, the following is claimed:

1. Apparatus for controlling the duty cycle of a pulse generator which provides a periodic input signal having a frequency proportional to the rate of movement of an input member and having means for comparing said input signal with a threshold signal and providing, for each cycle of said periodic signal, an ON signal so long as the magnitude of said input signal exceeds that of said threshold signal, and wherein said duty cycle corresponds with the ratio of the time duration of said ON signal to the duration of said cycle, said apparatus comprising:

means for providing clock pulses having a fixed frequency rate;

first counting means for counting the total number of said clock pulses occurring during an interval corresponding with a number N of said ON pulses to provide a total count of B;

second counting means for counting the total number of said clock pulses occurring during each of said N ON pulses during said interval and providing a total count of A;

threshold signal calculating means for calculating the ratio of A to B and providing a ratio R; and means for calculating a new value for said threshold signal wherein said new value varies as a function of the value of said ratio R.

2. Apparatus as set forth in claim 1 wherein said periodic signal is a sinusoidal signal.

3. Apparatus as set forth in claim 1 wherein said pulse generator is a rotary pulse generator and said periodic signal is a sinusoidal signal having a frequency proportional to the rate of rotation of a rotary input member.

4. Apparatus as set forth in claim 1 including third counting means for counting said N ON pulses for designating an interval during which said first counting means and said second counting means are enabled for counting said clock pulses.

5. Apparatus as set forth in claim 4 wherein said third counting means provides an enabling signal for a duration corresponding with said N ON pulses being counted by said third counting means.

6. Apparatus as set forth in claim 5 wherein said first counting means and said second counting means each includes means responsive to a said enabling signal provided by said third counting means for counting said clock pulses.

7. Apparatus as set forth in claim 4 including memory means for providing a set point S representative of a desired duty cycle ratio.

8. Apparatus as set forth in claim 7 wherein said threshold signal calculating means includes means for determining whether any difference exists between said set point S and said ratio R.

9. Apparatus as set forth in claim 8 including means for calculating the new value of said threshold signal in dependence upon any difference between the value of said ratio R and that of said set point S.

10. Apparatus as set forth in claim 9 including means for multiplying any difference between said set point S and said ratio R by a coefficient constant C with the product thereof being subtracted from the value of the threshold signal to obtain the new value of said threshold signal.

11. Apparatus as set forth in claim 4 including means for determining whether the new value of said threshold signal is greater than that of a reference value.

12. Apparatus as set forth in claim 11 including means for setting a flag indication when the new value of said threshold signal is greater than that of said reference value.

13. Apparatus as set forth in claim 12 including means for activating an alarm if a said flag indication has been set.

14. Apparatus as set forth in claim 4 including memory means coupled to said threshold signal calculating means and means for periodically supplying said threshold signal for storage in said memory means.

15. Apparatus as set forth in claim 14 wherein said memory means is a non-volatile memory means for providing said stored threshold signal for start up operations.

16. Apparatus as set forth in claim 4 including means for providing a set point S representative of a desired duty cycle ratio.

17. Apparatus as set forth in claim 16 wherein said threshold signal calculating means includes means for determining whether any difference exists between said set point S and said ratio R.

18. Apparatus as set forth in claim 17 including means for calculating the new value of said threshold signal in dependence upon any difference between the value of said ratio R and that of said desired ratio S.

19. Apparatus as set forth in claim 18 including means for multiplying any difference between said set point S and said ratio R by a coefficient constant C with the product thereof being subtracted from the value of the threshold signal T to obtain the new value of said threshold signal.

* * * * *